Figure 1:
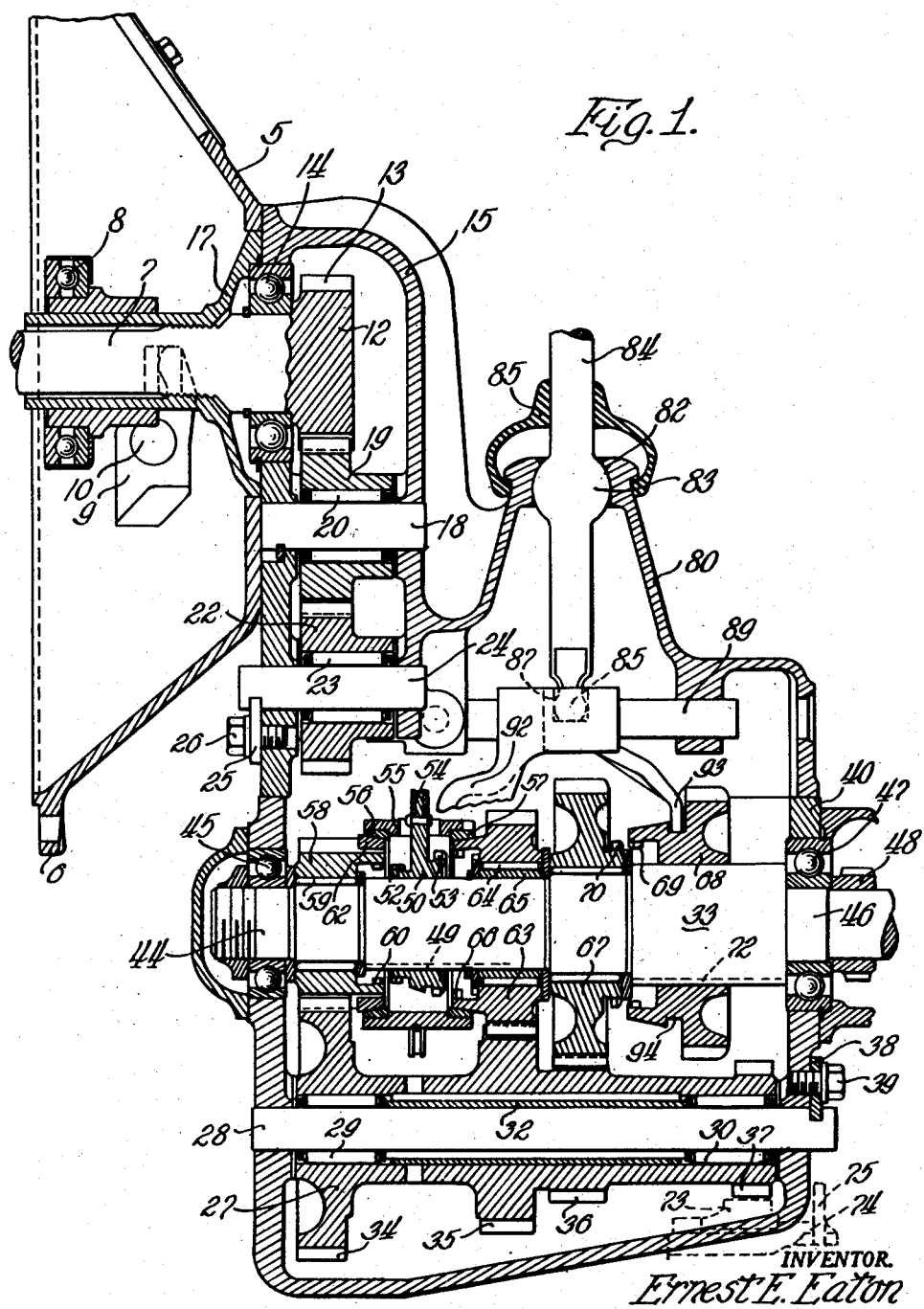

Sept. 7, 1948.  E. E. EATON  2,448,872
TRANSMISSION
Filed April 20, 1945  2 Sheets-Sheet 1

INVENTOR.
Ernest E. Eaton
BY Walter E. Schirmer
Atty.

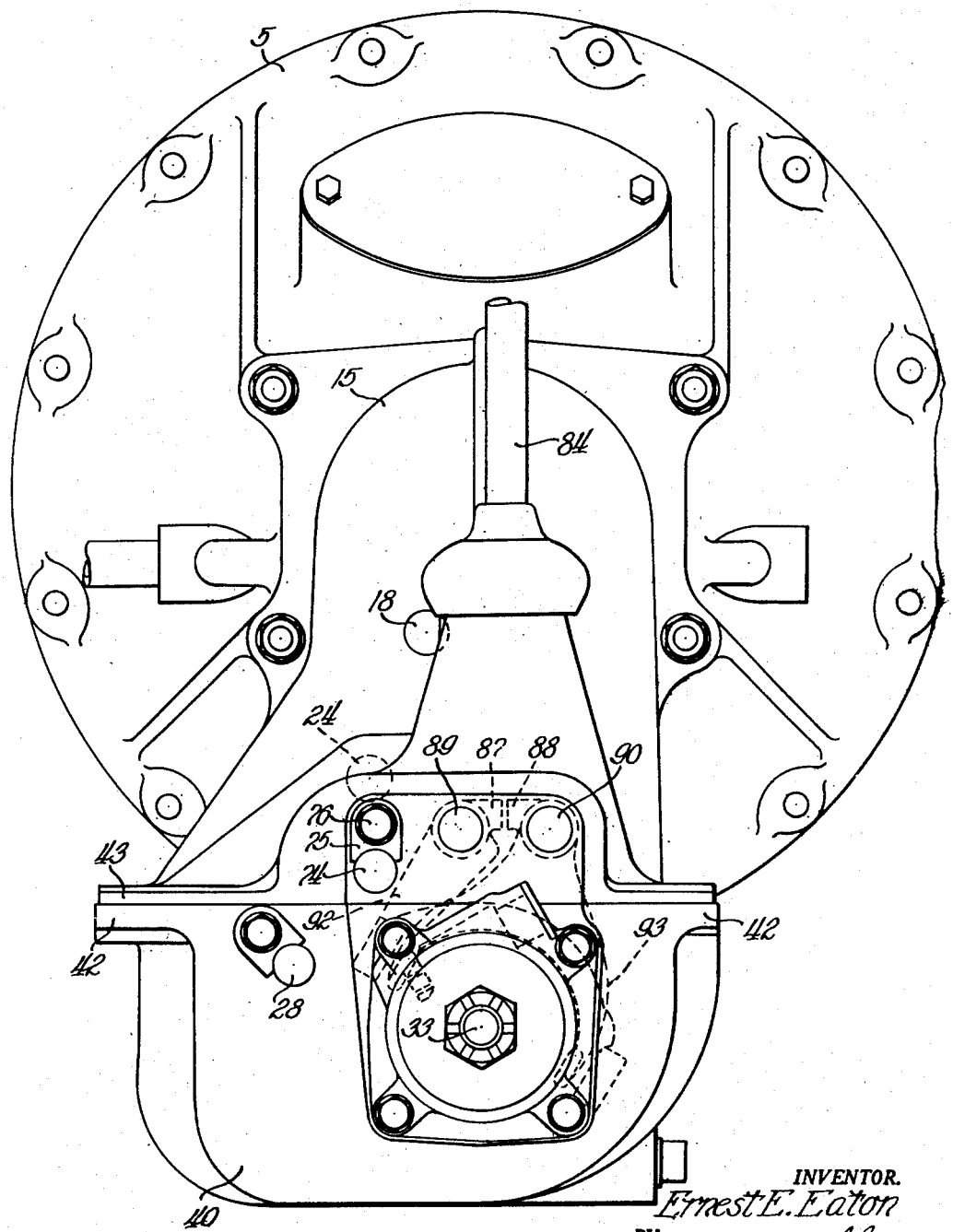

Patented Sept. 7, 1948

2,448,872

UNITED STATES PATENT OFFICE 2,448,872

TRANSMISSION

Ernest E. Eaton, Berrien Springs, Mich., assignor to Clark Equipment Company, Buchanan, Mich., a corporation of Michigan Application April 20, 1945, Serial No. 589,399

7 Claims. (Cl. 74—325)

1

This invention relates to transmissions, and more particularly is concerned with the provision of a transmission of the drop gear type especially useful in automotive vehicles such as house-to-house delivery trucks and similar types of vehicles where a lower floor level is desired without sacrificing the operating characteristics of the transmission.

One of the primary objects of the present invention is to provide a transmission of this type in which the output shaft of the transmission is disposed appreciably below the center line of the engine and clutch, and yet the ground clearance of the transmission case is maintained sufficiently high to prevent interference when driving in rutty roads, through snow, or the like.

Another object of the present invention is to provide a transmission having the desired gear reduction trains with simplicity of operation and yet to incorporate the desired features of compactness and lowering of the output shaft.

A still further object of the present construction is to provide a transmission having relatively low overall height so as to provide the desired drop in the floor level of the vehicle while maintaining adequate ground clearance.

Still other objects of the present invention will appear more fully from the following detail description which, taken in conjunction with the accompanying drawings, will disclose to those skilled in the art the particular construction and operation of a preferred form of the present invention.

In the drawings:

Figure 1 is a vertical sectional view through a transmission embodying the present invention; and Figure 2 is a rear end view of the transmission shown in Figure 1.

Referring now in detail to the drawings, there is disclosed a bell housing 5, of more or less conventional form, which is provided with the peripheral flange 6 adapted to be bolted or otherwise suitably secured to the flywheel housing of the engine. Disposed within the bell housing 5 and extending rearwardly therethrough is a clutch shaft 7 adapted to be driven from the driven element of a clutch (not shown) and having the conventional clutch throw-out bearing 8 actuated by means of the clutch operating arm 9 mounted on a clutch actuated pivot shaft 10.

The pinion shaft 7 is adapted to extend rearwardly of the bell housing 5 and is provided with enlarged end 12 carrying gear teeth 13, the shaft being journalled adjacent the gear portion 12 by

2 means of the ball bearing assembly 14 mounted in a suitable bearing support formed in a housing 15. A suitable bearing retainer sleeve 17 is provided for holding the outer race of the bearing in position and also for supporting the sliding throw-out clutch assembly 8.

The housing 15 depends vertically on the bell housing 5, and is provided with a stub shaft 18 upon which is rotatably journalled the intermediate gear member 19 as by means of the roller bearings 20. The gear 19 meshes with the gear teeth 13 of the pinion 12, and in turn has driving engagement with a second intermediate or idling gear 22 mounted by means of the roller bearings 23 upon a second shaft 24 secured in the housing 15 and held against rotation or axial movement by means of the key 25 secured in the forward wall of the housing 15 beneath the bell housing by means of the stud 26.

Considering Figure 1 in detail, this illustration of the transmission has been expanded in a vertical direction for the purpose of clarity, but as will be seen from Figure 2 the shafts 18 and 24 are disposed in laterally offset relation with respect to a vertical center line through the bell housing 5 and the housing 15 to gain vertical space, and the gear 22 is so arranged as to have driving engagement with the countershaft gear 27 mounted upon the fixed shaft 28 as by means of the roller bearing assemblies 29 and 30 separated by a conventional type of spacer sleeve 32. The shaft 28 actually is disposed in a position laterally offset from and slightly below the shaft 24 as will be seen from Figure 2, but for purposes of clarity to prevent obscuring of the other gears of the transmission, has been shown in Figure 1 out of position, since actually it would lie slightly above and laterally offset from the main output shaft 33. The countershaft gear 27 is a compound gear having the relatively large gear portion 34, intermediate gear portions 35 and 36, and a reverse gear portion 37, all of these being formed as a single or unitary member having a hollow bore providing for its mounting upon the bearings 29 and 30. The shaft 28 is held against axial movement or rotation by means of the key 38 held in position by a stud 39 threaded into the rear end wall of the transmission housing 40, which housing as shown in Figure 2, is of generally bowl shape provided with a peripheral flange 42 adapted to be bolted or otherwise suitably secured to a horizontal flange 43 formed at the lower end of housing 15.

The output shaft 33 of the transmission is provided with a reduced forward end 44 mounted by means of the ball bearing assembly 45 in the forward wall of the housing 40. At its opposite end the shaft 33 is provided with a reduced portion 46 mounted by means of the bearing assembly 47 in the rear end wall of the housing 40, and extending therethrough to a suitable driving connection with the propeller shaft of the vehicle (not shown). A suitable speedometer gear 48 is mounted on this extending portion of the shaft 33.

Intermediate the bearings 45 and 47 the shaft 33 is provided with a splined portion 49 upon which is mounted the sliding clutch member 50 having the external clutch teeth 52 and 53 on opposite ends thereof. This clutch member is provided with the radially extending portion 54 carrying the synchronizer sleeve 55 provided with friction synchronizer surfaces 56 and 57, respectively, at opposite ends thereof.

The gear portion 34 of the countershaft gear 27 is adapted to have constant meshing engagement with the gear member 58 rotatably journalled upon the shaft 33 adjacent the splined portion 49 as by means of the roller bearings 59. The gear 58 in turn carries the internal clutch teeth 60 adapted to be engaged by the clutch teeth 52 of the sliding clutch 50, and carries radially thereabout the friction surface 62 adapted to be engaged by the friction surface 56 of the synchronizer sleeve 55.

Thus, it will be seen that the clutch shaft 12 through the intermediate gears 19 and 22 drives the countershaft gear 27 which in turn is adapted to drive the gear 58 on the output shaft 33. By shifting the synchronizer mechanism to the left, as viewed in Figure 1, clutching engagement is effected between the gear 58 and the shaft 33 to provide for direct drive of this shaft from the countershaft.

A second gear 63 is rotatably journalled as by means of bearings 64 upon a sleeve 65 carried by the shaft 33 on the opposite side of the sliding clutch 50, and is provided with internal clutch teeth 66 adapted to be engaged by the clutch teeth 53 for clutching the gear 63 to the shaft 33 to provide a reduced drive to the shaft 33 from the gear portion 35 of the countershaft gear 27.

Also rotatably journalled upon the shaft 33 adjacent the gear 63 is another gear 67 which is fixed against axial movement as by means of suitable washers interposed between the gear 63 and the gear 67 and between a shoulder on the shaft at the opposite side of the gear 67. The gear 67 is in constant meshing engagement with the gear portion 36 of the countershaft gear, and is adapted to be clutched to the shaft 33 by means of the sliding clutch gear 68 which carries internal clutch teeth 69 adapted, when the gear 68 is shifted to the left, to engage the clutch teeth 70 of gear 67, whereby this gear may be clutched to the shaft 33 to provide a reduced driving connection from the countershaft gear 27 to gear portions 36 and 67. In this connection it will be noted that the sliding gear 68 is splined to the shaft as indicated at 72.

The gear portion 37 of countershaft gear 27 is adapted to have meshing engagement with a reverse idler gear 73 mounted upon the idler or layshaft 74, which shaft is disposed in a position directly below the shaft 24 and laterally offset with respect to the countershaft 28 as clearly indicated in Figure 2, the idler shaft 74 being held against axial movement by means of the key 75 held in position by the stud 76 bolted or threaded into the rear end wall of the housing 75.

15. The idler gear in Figure 1 is shown out of position for the sake of clarity, being arranged above and laterally inwardly of the countershaft 28. When the gear 68 is shifted to the right from the position shown in Figure 1, it is adapted to mesh with the idler gear member 73 to form a reverse gear drive from the countershaft through gear 37 and gear 73 to gear 68 splined on shaft 33.

From the construction thus far described it will be apparent that the clutch shaft 7 through intermediate gears 19 and 22 constantly drives the countershaft gear 27 whenever the clutch is engaged. This gear in turn is adapted to drive constantly the gears 58, 63 and 67 on the shaft 33, all of these gears being journalled for rotation relative to the shaft. By suitable shifting of the clutch 50 or the clutch gear 68 selective engagement of any of the gears, 58, 63, or 67 with the shaft 33 can be obtained, thus providing a constant mesh transmission of the three-speed type. Reverse speed is obtained by shifting the gear 68 in the opposite direction to engage the idler gear 73 constantly driven from the gear portion 37 of the countershaft.

The housing 15 is provided rearwardly of the shafts 18 and 24 with a vertically extending gear shift control tower 80 having a suitable seating portion 82 at its upper end adapted to receive the ball portion 83 of a gear shift control lever 84 extending vertically therein. The shift lever 84 is suitably sealed against the entrance of dirt or the like by means of a flexible leather or rubber boot 85, and its lower end 86 is formed as a ball member adapted to engage in suitable shift lugs 87 and 88 mounted for axial sliding movement on shift rails 89 and 90, respectively. The shifter lug 87 is arranged to have axial sliding movement on the shift rail 89 when the gear shift lever 84 is rocked in a clockwise direction as shown in Figure 2 to engage the lower end 85 within a notched or recessed portion of the lug 87. A suitable shifter fork 92 carried by the lug 87 is adapted to engage the shift flange or yoke 54 of the synchronizer clutch 50 to provide for optional shifting of this mechanism to clutch gear 58 to shaft 33 or to clutch gear 63 to shaft 33. This is accomplished thru the synchronizer mechanism which may be of the blocking type which requires that the gear 58 and the shaft 33 must be rotating at approximately synchronous speed before such clutching engagement can be effected.

The opposite shifter lug 88 is adapted to be engaged by the lower end 85 of the gear shift lever when it is rocked in the opposite direction, and is axially slidable on the shift rail 90 to provide for actuation of the shift fork 93 engaged in a suitable shift groove or collar portion 94 of the gear 68, whereby this gear may be shifted axially on the spline 72 to provide for coupling gear 67 to shaft 33 or for engagement of gear 68 with the idler reverse gear 73. Thus, it will be seen that a simplified but effective shift control mechanism is provided for producing the three forward and one reverse speeds through the transmission.

It will also be apparent from Figure 2 that the effective vertical extent of the transmission is appreciably reduced by the lateral offset of the countershaft gear 28, and the interpositioning of the idler reverse gear shaft 74 between the intermediate shaft 24 and the countershaft and output shafts. This provides for lowering of the output shaft 33 to a point below the countershaft 28 and the reverse gear shaft 74, thereby providing for relatively low horizontal positioning of the output shaft while at the same time maintaining the desired road clearance.

I am aware that various changes may be made in certain details of the present construction, and therefore do not intend to be limited except as defined by the scope and spirit of the appended claims.

I claim:

1. In a transmission, and clutch assembly including a bell housing for said clutch, a driven shaft in said assembly projecting rearwardly out of said housing, a depending housing secured to said bell housing having a rearward extension below the bell housing including a vertical control tower, a bowl-shaped transmission housing secured to the underside of said depending housing and carrying a transmission main shaft disposed beneath said driven shaft in vertical alinement therewith, a countershaft disposed in said bowl-shaped housing above and laterally offset relative to said main shaft, gear trains between said shafts, and short stub shafts journalled in said depending housing and arranged in an inclined plane between said driven shaft and said countershaft and carrying intermediate gears for driving said countershaft from said driven shaft.

2. The assembly of claim 1 including a reverse idler gear shaft disposed laterally between and above said main shaft and countershaft and journalled in the lower portion of said depending housing.

3. In combination, a bell housing having a clutch shaft extending therethrough, a depending housing secured to said bell housing and including vertically superposed stub shafts carrying intermediate gears driven from said clutch shaft, a rearward extension on said depending housing carrying a reverse gear shaft, a bowl-shaped transmission housing secured to the underside of said depending housing and having a transmission main shaft journalled therein, a countershaft journalled in said transmission housing above and laterally offset from said main shaft, a compound gear on said countershaft driven from the lower of said intermediate gears, said compound gear having constant driving engagement with axially spaced gears on said main shaft and with an idler gear on said reverse shaft, and means for selectively coupling said main shaft gears to said main shaft, including shiftable gear means on said main shaft for coupling said idler reverse gear to said main shaft.

4. The combination, with a clutch bell housing having a clutch shaft extending therethrough, of a depending transmission assembly including a bowl-shaped transmission housing having laterally spaced shafts therein, one of said shafts constituting a main shaft disposed in a vertical plane beneath said clutch shaft, gear trains between said shafts, said housing having a vertically upwardly extending portion secured to said bell housing about said clutch shaft, parallel stub shafts in said portion in vertical spaced relation and lying in a common plane with the other of said transmission shafts inclined to said vertical plane carrying intermediate gears driven from said clutch shaft, the lowermost of said intermediate gears having driving engagement with one of the gear trains on the other of said shafts in said transmission housing.

5. In combination, a clutch shaft having a gear on the end thereof, a pair of vertically spaced intermediate stub shafts having idler gears thereon in meshing engagement, the upper of said gears being driven from said clutch gear, a countershaft having gear means thereon driven from the lower of said idler gears, a main shaft having gear means thereon driven from said countershaft gear means, said clutch shaft and main shaft lying in the same vertical plane, and said clutch shaft, stub shafts and countershaft lying in a common plane inclined laterally to one side of said vertical plane.

6. The combination of claim 5 including a reverse gear shaft disposed above said countershaft and main shaft and disposed intermediate said planes.

7. The combination of claim 5 wherein a line connecting the axis of said countershaft and main shaft forms, with said planes, a triangle, and a reverse gear shaft disposed within said triangle.

ERNEST E. EATON.

REFERENCES CITED

The following references are of record in the file of this patent:

UNITED STATES PATENTS

| Number | Name | Date |
| --- | --- | --- |
| 2,034,141 | Gustafson | Mar. 17, 1936 |
| 2,045,011 | Griswold | June 23, 1936 |
| 2,082,826 | Frisby | June 8, 1937 |
| 2,138,618 | Seyerle | Nov. 29, 1938 |
| 2,300,502 | Haltenberger | Nov. 3, 1942 |
| 2,341,756 | Avila | Feb. 15, 1944 |